United States Patent
Wörner et al.

(10) Patent No.: US 6,251,969 B1
(45) Date of Patent: Jun. 26, 2001

(54) THERMOCURABLE, ONE-COMPONENT, ADDITION-CROSSLINKING SILICONE COMPOSITIONS

(75) Inventors: Christof Wörner; Frank Achenbach; Jochen Ebenhoch, all of Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/442,081

(22) Filed: Nov. 16, 1999

(30) Foreign Application Priority Data

Dec. 4, 1998 (DE) .............................. 198 51 764

(51) Int. Cl.⁷ .................................................. G08G 77/08
(52) U.S. Cl. .......................... 523/201; 523/209; 523/211; 502/158; 502/339
(58) Field of Search ..................... 523/201, 209, 523/211; 502/158, 339

(56) References Cited

U.S. PATENT DOCUMENTS

| | | |
|---|---|---|
| 4,481,341 | 11/1984 | Schlak et al. . |
| 5,017,654 * | 5/1991 | Togashi et al. ...................... 525/100 |
| 5,321,058 * | 6/1994 | Fuchigami et al. .................. 523/211 |
| 5,410,007 | 4/1995 | Lewis et al. . |
| 5,494,750 * | 2/1996 | Fujioka et al. .................. 428/402.21 |
| 5,525,425 | 6/1996 | Fujioka et al. . |
| 5,854,369 | 12/1998 | Geck et al. . |

FOREIGN PATENT DOCUMENTS

| | | |
|---|---|---|
| 0 347 895 A2 | 6/1989 | (EP) . |
| 0 661 349 A2 | 7/1995 | (EP) . |
| 0 744 432 A1 | 5/1996 | (EP) . |
| 0 744 432 A1 | 11/1996 | (EP) . |

OTHER PUBLICATIONS

Derwent Abstract corr. t EP 0 744 432 A1.

* cited by examiner

Primary Examiner—Margaret G. Moore
(74) Attorney, Agent, or Firm—Brooks & Kushman P.C.

(57) ABSTRACT

Organopolysiloxane particles containing hydrosilylation catalysts (H) and organopolysiloxane (O) and having a particle size of 0.01–10 $\mu$m have, at least in the outermost shell, no glass-transition temperature, softening point or melting point in the range 20° C.–260° C. These organopolysiloxane particles enable the preparation of one-component, addition-crosslinking, thermocurable silicone compositions having a long shelf life.

8 Claims, No Drawings

THERMOCURABLE, ONE-COMPONENT, ADDITION-CROSSLINKING SILICONE COMPOSITIONS

TECHNICAL FIELD

The invention relates to organopolysiloxane particles containing hydrosilylation catalysts, and to storage-stable, one-component, addition-crosslinking, thermocurable silicone compositions.

BACKGROUND ART

U.S. Pat. No. 4,481,341, EP-A-661349 and U.S. Pat. No. 5,525,425 describe silicone resins which display a glass transition temperature, softening point, or melting point. These silicone resins can be used as encapsulation materials for hydrosilylation catalysts. To prepare such encapsulated catalysts, the silicone resins are dissolved in an organic solvent, and a hydrosilylation catalyst is added. The encapsulated hydrosilylation catalysts are obtained, for example, by removing the solvent and subsequently powdering the product, or by spray-drying the catalyst-containing silicone resin solution. With the aid of these encapsulated catalysts, one-component addition-crosslinking silicone compositions can be prepared.

The disadvantage of these encapsulated catalysts is that siloxane particles with different morphological structures cannot be synthesized using different siloxane units. It is therefore not possible to produce core/shell structures or to adjust the surface composition in a specific manner, and thus it is not possible to modify the compatibility or dispersibility of the encapsulated catalyst particles in the silicone composition by varying the particle surface composition. There is likewise a risk that the encapsulated catalyst, owing to the temperature increase during compounding, is liberated very quickly after the softening point or glass-transition temperature of the encapsulant has been reached, causing the silicone composition to crosslink prematurely during compounding.

DISCLOSURE OF INVENTION

An object of the present invention was to provide organopolysiloxane particles containing hydrosilylation catalysts suitable for producing storage-stable, one-component silicone compositions, without the disadvantages of prior art encapsulated catalysts.

BEST MODE FOR CARRYING OUT THE INVENTION

The invention relates to organopolysiloxane particles containing hydrosilylation catalysts (H) and organopolysiloxanes (O) which have a particle size of 0.01–10 μm and which, at least in the outermost shell, do not have a glass-transition temperature softening point or melting point in the range of 20° to 250° C.

The organopolysiloxane particles of the present invention are readily dispersible in addition-crosslinkable silicone compositions. It has been found that organopolysiloxane particles of this type containing hydrosilylation catalysts (H) are capable of liberating the catalyst (H) at temperatures below 250° C., although they do not exhibit, at least in the outermost shell, a glass- transition temperature, melting point or softening point in the range 20–250° C. as measured by DSC. Consequently these encapsulated hydrosilylation catalysts (H) enable the preparation of storage-stable, one-component, addition-crosslinking, thermocurable silicone compositions. Owing to the morphological variety and variation of the siloxane units in such organopolysiloxane particles, the liberation of the catalysts, i.e. the crosslinking characteristics, and the pot life of addition-crosslinking silicone compositions, as well as the dispersibility of the siloxane particles in the silicone composition can be adjusted in a targeted manner.

The organopolysiloxane particles can be homogeneous throughout and consist only of a core or can be built up from core and shell(s), similarly to an onion. If the organopolysiloxane particles are built up from a core and shell(s), the outermost shell constitutes at least 0.1% by weight, in particular at least 0.5% by weight, of the total organopolysiloxane particle. The compositions of core and shell(s) can differ, for example, through their content of hydrosilylation catalysts (H) and/or the type of their organopolysiloxane constituent (O).

The organopolysiloxane (O) of the organopolysiloxane particles is preferably built up from from 0 to 40.0% by weight of units of the general formula $$[R_3SiO_{1/2}] \tag{1},$$

from 0 to 95.0% by weight of units of the general formula $$[R_2SiO_{2/2}] \tag{2},$$

from 0 to 100% by weight of units of the general formula $$[RSiO_{3/2}] \tag{3},$$

and from 0 to 60.0% by weight of units of the general formula $$[SiO_{4/2}] \tag{b 4},$$

where

R are identical or different monovalent, SiC-bonded, optionally substituted $C_1$- to $C_{18}$-hydrocarbon radicals, with the proviso that the units of the general formulae (1) to (4) together contain at most 10% by weight, in particular at most 5% by weight, of uncondensed radicals $\equiv$Si—OH and unhydrolyzed radicals $\equiv$Si—$OR^1$, where $R^1$ are identical or different monovalent, SiOC-bonded, optionally substituted $C_1$- to $C_8$-hydrocarbonoxy radicals.

The total amount of the units of the general formulae (3) and (4) is preferably at least 5.0% by weight, in particular at least 10.0% by weight. This total number of units is based on the overall composition of the organopolysiloxane constituent (O), which can, if desired, consist of core and shell(s) of different composition. The particles can also have, for example, individual shells containing less than 5.0% by weight of units of the general formulae (3) and (4).

The organopolysiloxane in the organopolysiloxane particles preferably comprises from 0.5 to 20% by weight of units of the general formula (1), from 0 to 75% by weight of units of the general formula (2), from 5 to 99% by weight of units of the general formula (3), and from 0 to 40% by weight of units of the general formula (4).

Examples of unsubstituted hydrocarbon radicals R are alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; alkenyl radicals such as the vinyl, allyl, n-5-hexenyl, 4-vinylcyclohexyl and 3-norbornenyl radicals; cycloalkyl radicals such as cyclopentyl, cyclohexyl, 4-ethylcyclohexyl, cycloheptyl, norbornyl and methylcyclohexyl radicals; aryl radicals such as the phenyl, biphenylyl, naphthyl, anthryl and phenanthryl radicals; alkaryl radicals, such as o-, m-, and p-tolyl radicals, xylyl radicals and ethylphenyl radicals; aralkyl radicals such as the benzyl radical and the α- and β-phenylethyl radicals, and the fluorenyl radical.

Examples of substituted hydrocarbon radicals as radicals R are halogenated hydrocarbons, such as the chloromethyl, 3-chloropropyl, 3-bromopropyl, 3,3,3-trifluoropropyl and 5,5,5,4,4,3,3-hexafluoropentyl radicals and the chlorophenyl, dichlorophenyl and trifluorotolyl radicals.

The hydrocarbon radical R is preferably an unsubstituted or substituted $C_1$- to $C_6$-alkyl radical or a phenyl radical, in particular a methyl, phenyl or vinyl radical. It is preferred for 10–98 mol % of the hydrocarbon radicals R to comprise phenyl groups and 2–25 mol % of the hydrocarbon radicals R to comprise vinyl groups.

The hydrocarbonoxy radical $R^1$ is preferably an unsubstituted or substituted $C_1$- to $C_6$-alkoxy radical or a phenoxy radical, in particular a methoxy or ethoxy radical.

The hydrosilylation catalyst (H) used can be any known catalyst which catalyzes the hydrosilylation reactions occurring during crosslinking of addition-crosslinking silicone compositions. The hydrosilylation catalysts (H) employed can be, in particular, metals and their compounds, such as platinum, rhodium, palladium, ruthenium and iridium, preferably platinum and platinum compounds. Particular preference is given to platinum compounds which are soluble in polyorganosiloxanes. Examples of soluble platinum compounds are the platinum-olefin complexes of the formulae $(PtCl_2.olefin)_2$ and $H(PtCl_3.olefin)$, preference being given to alkenes having 2 to 8 carbon atoms, such as ethylene, propylene, isomers of butene and octene, or cycloalkenes having 5 to 7 carbon atoms, such as cyclopentene, cyclohexene and cycloheptene. Further soluble platinum catalysts are the platinum-cyclopropane complex of the formula $(PtCl_2C_3H_6)_2$; the products of the reaction of hexachloroplatinic acid with alcohols, ethers and aldehydes, or mixtures thereof; or the product of the reaction of hexachloroplatinic acid with methylvinyl-cyclotetrasiloxane in the presence of sodium bicarbonate in ethanolic solution. Particular preference is given to complexes of platinum with vinylsiloxanes, such as sym-divinyltetramethyldisiloxane. The weight of metal present in the hydrosilylation catalyst (H) is preferably 0.01 to 4% by weight, based on the weight of the particles.

The organopolysiloxane particles can be prepared, for example, by the process described in EP-A-744432, herein incorporated by reference.

The invention furthermore relates to a process for the preparation of the organopolysiloxane particles in which, in a first step, a colloidal suspension of organopolysiloxane particles is prepared by metered addition of silanes of the general formula (5)

$$R_cSi(OR^1)_{4-c} \quad (5),$$

and, if desired, organosilicon compounds of the general formula (6)

$$R_d(R^1O)_eSiO_{4-d-e/2} \quad (6),$$

where
$R^1$ is as defined above,
c has the value 0, 1, 2 or 3 and
d and e each, independently of one another, have the value 0, 1, 2, 3 or 4, into an agitated mixture of emulsifier and water.

The addition of the organosilicon compounds of the general formula (6) can also take place sequentially, facilitating a core/shell(s) structure morphology.

In a second step, an organosilicon compound of the general formula (7)

$$(R^2_3Si)_fY^1 \quad (7),$$

is added to the mixture of emulsifier and water,
where
$Y^1$ is —OH, —$OR^3$, —$ONR^3_2$ or —$OOCR^3$ when f=1 and —O— when f=2,
$R^3$ is an optionally substituted $C_1$- to $C_8$-hydrocarbon radical,
$R^2$ is as defined for R, and
f has the value 1 or 2,
with the proviso that the hydrosilylation catalyst (H) is added before, during or after build-up of the organopolysiloxane particles. Examples of radicals $R^3$ are listed above for the radicals R.

The organopolysiloxane particles can be isolated from the resultant colloidal suspension by, for example, coagulation of the latices by addition of salt, by addition of polar solvents or by spray-drying methods. It is also possible to dissolve the hydrosilylation catalyst-free organopolysiloxane particles, in a solvent, to subsequently add a hydrosilylation catalyst (H) followed by removal of the solvent or by spray-drying the mixture to yield hydrosilylation catalysts (H) encapsulated in organopolysiloxane particles.

The subject process enables the preparation of organopolysiloxane particles which have a specific morphological structure, for example having different layer structures, so that core/shell morphologies with one or more shells of defined core, shell and particle-surface composition can be generated specifically. This allows the dispersibility of these organopolysiloxane particles in silicone compositions to be adjusted in a specific manner, for example the dispersibility and ease of incorporation of the organopolysiloxane particles into silicone compositions can be considerably improved by surface modification with trialkylsilyl groups.

It is likewise possible to add the hydrosilylation catalyst (H) early during synthesis of the organopolysiloxane particles (in-situ encapsulation), enabling the process step of subsequent encapsulation to be omitted. In addition, the build-up of core/shell structures determines the site of residence of the hydrosilylation catalyst (H) in the organopolysiloxane particles. The encapsulation of the hydrosilylation catalyst (H) can also be carried out after preparation of the organopolysiloxane particles. In this case, the organopolysiloxane particle-containing materials are dispersed in a solvent, and a hydrosilylation catalyst (H) is added. Removal of the solvent gives the encapsulated hydrosilylation catalysts (H). The removal of the solvent can also be carried out by spray-drying methods. Irrespective of the preparation variant, the fraction of hydrosilylation catalyst (H) on the surface of the organopolysiloxane particles that is not encapsulated can be removed by washing with a solvent or silicone oil in which the catalyst is soluble.

The organopolysiloxane particles may additionally contain an inhibitor which is customary in addition-crosslinking silicone compositions, such as, for example, ethynylcyclohexanol. This can be introduced as described above during preparation of the organopolysiloxane particles in the process steps described or after the particle synthesis by dissolving the particles in an inert solvent, adding the inhibitor and subsequently removing the solvent.

The invention also relates to a one-component, addition-crosslinking, thermocurable silicone composition which comprises the constituents (I) an alkenyl-functional polyorganosiloxane, (II) an SiH-functional crosslinking agent, and (III) organopolysiloxane particles containing hydrosilylation catalysts (H) and organopolysiloxane (O).

The content of organopolysiloxane particles containing hydrosilylation catalysts (H) is selected in such a way that the addition-crosslinking silicone composition has a Pt content of 0.1–100 ppm, preferably 0.5–40 ppm.

Constituent (I) of the silicone composition is a polyorganosiloxane containing at least two alkenyl groups per molecule and preferably having a viscosity of from 0.1 to 500,000 Pa.s, in particular from 1 to 100 Pa.s, at 25° C.

The composition of the polyorganosiloxane (I) containing alkenyl groups preferably conforms to the average general formula (9)

$$R^4_x R^5_y SiO_{(4-x-y)/2} \quad (9),$$

in which

R$^4$ are identical or different monovalent, optionally halogen- or cyano-substituted $C_1$–$C_{10}$-hydrocarbon radicals containing aliphatic carbon-carbon multiple bonds and optionally bonded to silicon via a divalent organic group, R$^5$ are identical or different monovalent, optionally halogen- or cyano-substituted, SiC-bonded $C_1$–$C_{10}$-hydrocarbon radicals containing no aliphatic carbon-carbon multiple bonds, x is a non-negative number such that at least two radicals R$^4$ are present in each molecule, and y is a non-negative number such that (x+y) is in the range from 1.8 to 2.5.

The alkenyl groups R$^4$ can undergo an addition reaction with an SiH-functional crosslinking agent. Preference is given to alkenyl groups having 2 to 6 carbon atoms, such as vinyl, allyl, methallyl, 1-propenyl, 5-hexenyl, ethynyl, butadienyl, hexadienyl, cyclopentenyl, cyclopentadienyl or cyclohexenyl, preferably vinyl or allyl.

Divalent organic groups via which the alkenyl groups R$^4$ can be bonded to silicon in the polymer chain consist, for example, of oxyalkylene units, such as those of the general formula (10)

$$-(O)_m[(CH_2)_nO]_o- \quad (10),$$

in which m has the value 0 or 1, in particular 0, n has a value of from 1 to 4, in particular 1 or 2, and o has a value of from 1 to 20, in particular from 1 to 5.

The oxyalkylene units of the general formula (10) are bonded on the left to a silicon atom.

The radicals R$^4$ can be bonded in any position of the polymer chain, in particular to the terminal silicon atoms. Examples of radicals R$^5$ are listed above for radicals R. R$^5$ preferably has 1 to 6 carbon atoms. Particular preference is given to methyl and phenyl radicals.

Constituent (I) can also be a mixture of various polyorganosiloxanes containing alkenyl groups which differ, for example, in the alkenyl group content, the nature of the alkenyl group or structurally.

The structure of the polyorganosiloxanes containing alkenyl groups can be linear, cyclic, or branched. The content of tri- and/or tetrafunctional units resulting in branched polyorganosiloxanes is typically very low, i.e., preferably at most 20 mol %, in particular at most 0.1 mol %.

Particular preference is given to polydimethylsiloxanes containing vinyl groups whose molecules conform to the general formula (11)

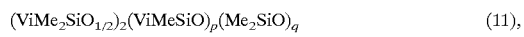

$$(ViMe_2SiO_{1/2})_2(ViMeSiO)_p(Me_2SiO)_q \quad (11),$$

where the non-negative integers p and q satisfy the following relationships: p≧0, 50<(p+q)<20,000, preferably 200<(p+q)<1000, and 0<(p+1)/(p+q)<0.2.

Constituent (II) of the silicone composition is an SiH-functional crosslinking agent whose composition conforms to the following average formula (12):

$$H_h R^6_i SiO_{(4-h-i)/2} \quad (12),$$

in which

R$^6$ is as defined for R$^5$ and h and i are non-negative integers, with the proviso that 0.5<(h+i)<3.0 and 0<h<2, so that at least two silicon-bonded hydrogen atoms are present per molecule.

It is preferred to use a crosslinking agent (II) containing three or more SiH bonds per molecule. If an agent having only two SiH bonds per molecule is used, it is advisable to use a polyorganosiloxane (I) containing alkenyl groups which has at least three alkenyl groups per molecule.

The hydrogen content of the crosslinking agent (II) relating exclusively to hydrogen atoms bonded directly to silicon atoms is preferably in the range from 0.002 to 1.7% by weight of hydrogen, preferably from 0.1 to 1.7% by weight of hydrogen. The SiH-functional crosslinking agent (II) preferably contains at least three and at most 600 silicon atoms per molecule. Preference is given to SiH crosslinking agents (II) containing from 4 to 200 silicon atoms per molecule. The structure of the SiH crosslinking agent (II) can be linear, branched, cyclic or network-like.

Particularly preferred SiH crosslinking agents are linear polyorganosiloxanes of the general formula (13)

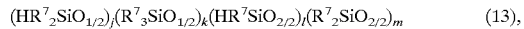

$$(HR^7_2SiO_{1/2})_j(R^7_3SiO_{1/2})_k(HR^7SiO_{2/2})_l(R^7_2SiO_{2/2})_m \quad (13),$$

where

R$^7$ is as defined for R$^5$, the non-negative integers j, k, l and m satisfy the following relationships: (j+k)=2, (j+l)>2, 5<(l+m)<200 and 1<l/(l+m)<0.1.

The SiH-functional crosslinking agent is preferably present in the crosslinkable silicone rubber composition in such an amount that the molar ratio between SiH groups and alkenyl groups is from 0.5 to 5, in particular from 1.0 to 3.0.

In order to achieve sufficiently high mechanical strength of the silicone rubber, it is preferred to incorporate actively reinforcing fillers into the silicone rubber composition as constituent (IV). The actively reinforcing fillers (IV) used are principally precipitated and pyrogenic silicic acids and mixtures thereof. The specific surface area of these actively reinforcing fillers should be at least 50 m$^2$/g or preferably in the range from 100 to 400 m$^2$/g, determined by the BET method. Actively reinforcing fillers of this type are very well known materials in the area of silicone rubbers. The content of actively reinforcing filler (IV) in the crosslinkable silicone rubber composition is in the range from 0 to 60% by weight, preferably from 10 to 40% by weight.

The silicone rubber composition according to the invention can optionally contain, as constituent (V) further additives in a proportion of up to 70% by weight, preferably from 0.01 to 40% by weight. These additives can be, for example, non-reinforcing fillers, dispersion auxiliaries, adhesion promoters, inhibitors, pigments, dyes, plasticizers, heat stabilizers, etc.

The silicone compositions are compounded by mixing the abovementioned components in any desired sequence. The organopolysiloxane particles (III) containing the hydrosilylation catalyst are preferably added to the addition-crosslinking silicone composition as the final constituent. The organopolysiloxane particles (III) can also first be dispersed in a diorganopolysiloxane or a filler-containing diorganopolysiloxane and subsequently added to the addition-crosslinking silicone composition.

The addition-crosslinking silicone compositions can have a pot life of several months at room temperature and exhibit rapid crosslinking characteristics at elevated temperatures.

The silicone compositions described above are suitable for all conceivable moldings and areas of application in which addition-crosslinked silicone elastomers are employed, for example including for sealing moldings.

In the examples below, unless otherwise stated, all pressures are 0.10 MPa (abs.), and all temperatures are 20° C.

EXAMPLES

Example 1

(not according to the invention; preparation of a platinum/vinylsiloxane complex)

3.0 g of an aqueous hexachloroplatinic acid solution having a Pt content of 32% and 9.2 g of 1,3-divinyltetramethyldisiloxane were dissolved in 15 g of isopropyl alcohol and 27 g of toluene, 5.6 g of sodium hydrogencarbonate were added, and the mixture was heated at 80° C. for 30 minutes with stirring. Cooling of the mixture, disposal of the residue and removal of the alcohol under reduced pressure gave a toluene solution of the platinum/1,3-divinyltetramethyldisiloxane complex having a Pt content of 2.6%.

Example 2

A mixture of 40.9 g of phenyltriethoxysilane, 4.9 g of vinyl-triethoxysilane and 8.8 g of methyltrimethoxysilane were metered into 298.8 g of water, 1.2 g of sodium lauryl sulfate and 0.7 g of 10 normal NaOH over the course of 12 hours at 85° C. with stirring. The resultant suspension was adjusted to a pH of 2 at room temperature using 0.2 normal HCl solution, 19.9 g of hexamethyldisiloxane were added at 60° C., and the mixture was then stirred for 4 hours. After neutralization using 0.2 normal NaOH at room temperature, 3.6 g of the platinum/1,3-divinyltetramethyldisiloxane complex prepared in Example 1 were added, and the mixture was stirred for 1 hour. After the organic solvent had been removed under reduced pressure, the suspension was broken by addition of 600 ml of methanol. The precipitated solid was filtered off, washed a number of times with methanol and hexamethyldisiloxane and dried under a high vacuum, giving 28.1 g of a white powder containing $[CH_3SiO_{3/2}]$, $[C_6H_5SiO_{3/2}]$, $[C_2H_3SiO_{3/2}]$ and $[(CH_3)_3SiO_{1/2}]$ units. Scanning electron microscopy showed a mean particle radius of 26 nm. DSC (differential scanning calorimetry) at a heating rate of 10 K/min did not show any glass transition temperature or melting point in the range 20° C.–260° C. Neither did a melting-point determination in a glass tube show a softening or melting point. The platinum content of the siloxane particles was 0.20% by weight.

Example 3

A mixture of 44.0 g of phenyltriethoxysilane, 3.9 g of vinyl-triethoxysilane and 7.7 g of methyltrimethoxysilane were metered into 298.8 g of water, 1.2 g of sodium lauryl sulfate and 0.7 g of 10 normal NaOH over the course of 12 hours at 85° C. with stirring. The resultant suspension was adjusted to a pH of 2 at room temperature using 0.2 normal HCl solution, 19.9 g of hexamethyldisiloxane were added at 60° C., and the mixture was then stirred for 4 hours. By shaking the aqueous suspension with 300 ml of toluene, the siloxane particles were transferred into the organic phase. After separation, 3.6 g of the platinum/1,3-divinyltetramethyldisiloxane complex prepared in Example 1 were added, and the mixture was stirred for 1 hour. Removal of the organic solvent under reduced pressure and washing of the siloxane particles a number of times with hexa-methyldisiloxane gave 25.2 g of a white powder containing $[CH_3SiO_{3/2}]$, $[C_6H_5SiO_{3/2}]$, $[C_2H_3SiO_{3/2}]$ and $[(CH_3)_3SiO_{1/2}]$ units. Scanning electron microscopy showed a mean particle radius of 24 nm. DSC at a heating rate of 10 K/min did not show any glass transition temperature or melting point in the range 20° C.–260° C. Neither did a melting-point determination in a glass tube show a softening or melting point. The platinum content of the siloxane particles was 0.34% by weight.

Example 4

In contrast to Example 2, a mixture of 29.3 g of phenyl-triethoxysilane and 21.7 g of methyltrimethoxysilane was used. 24.4 g of a white powder containing $[CH_3SiO_{3/2}]$, $[C_6H_5SiO_{3/2}]$ and $[(CH_3)_3SiO_{1/2}]$ units were obtained. The resultant siloxane particles, having a mean particle diameter of 29 nm, did not exhibit any softening or melting point in the temperature range 20° C.–260° C. The Pt content was 0.14%.

Example 5

The synthesis was carried out as in Example 3, with the difference that no hexamethyldisiloxane was metered into the suspension. 25.1 g of a white powder containing $[CH_3SiO_{3/2}]$, $[C_6H_5SiO_{3/2}]$ and $[C_2H_3SiO_{3/2}]$ units were obtained. The resultant siloxane particles, having a mean particle diameter of 25 nm, did not exhibit any softening or melting point in the temperature range 20° C.–260° C. The Pt content was 0.36%.

Example 6

In contrast to Example 2, a mixture of 40.9 g of phenyl-triethoxysilane, 4.9 g of vinyltriethoxysilane, 5.7 g of tetraethoxysilane and 5.3 g of methyltrimethoxysilane was used. 26.2 g of a white powder containing $[CH_3SiO_{3/2}]$, $[SiO_{4/2}]$, $[C_6H_5SiO_{3/2}]$, $[(CH_3)_3SiO_{1/2}]$ and $[C_2H_3SiO_{3/2}]$ units were obtained. The resultant siloxane particles, having a mean particle diameter of 30 nm, did not exhibit any softening or melting point in the temperature range 20° C.–260° C. The Pt content was 0.21%.

Example 7

In contrast to Example 2, the metering of the alkoxysilane mixture, consisting of 40.9 g of phenyltriethoxysilane, 4.9 g of vinyltriethoxysilane and 8.8 g of methyltrimethoxysilane, was additionally followed, within 2 hours at 85° C., by addition of a mixture of 4.1 g of phenyltriethoxysilane and 0.9 g of methyl-trimethoxysilane. 29.4 g of a white powder containing $[CH_3SiO_{3/2}]$, $[C_6H_5SiO_{3/2}]$, $[(CH_3)_3SiO_{3/2}]$ and

[C₂H₃SiO_{3/2}] units were obtained. The resultant siloxane particles, having a mean particle diameter of 31 nm, did not exhibit any softening or melting point in the temperature range 20° C.–260° C. The Pt content was 0.22%.

Example 8

255 parts by weight of a vinyldimethylsiloxy-terminated polydimethylsiloxane having a viscosity of 20 Pa.s (25° C.) were introduced into a laboratory compounder and heated to 150° C., and 180 parts by weight of a hydrophobic pyrogenic silicic acid having a BET specific surface area of 300 m²/g and a carbon content of 3.9% by weight were added. This gave a highly viscous material, which was subsequently diluted with 165 parts by weight of the abovementioned polydimethylsiloxane. The volatile constituents were removed by compounding under reduced pressure (10 mbar) at 150° C. for one hour.

488 g of this base composition were mixed on a roll at a temperature of 25° C. with 0.30 g of ethynylcyclohexanol, 11.0 g of SiH crosslinking agent and 1.25 g of Pt-containing siloxane particles from Example 2 to give a silicone composition, where the SiH crosslinking agent was a copolymer of dimethylsiloxy, methylhydrogensiloxy and trimethylsiloxy units having a viscosity of 320 mPa.s at 25° C. and a content of Si-bonded hydrogen of 0.48% by weight. The Pt content of the silicone composition was 5 ppm.

Example 9

The preparation of an addition crosslinkable organopolysiloxane composition was carried out as described in Example 8, but 0.735 g of the Pt-containing siloxane particles prepared in Example 3 were used.

Example 10

The preparation of an addition crosslinkable organopolysiloxane composition was carried out as described in Example 8, but 1.79 g of the Pt-containing siloxane particles prepared in Example 4 were used.

Example 11

The preparation of an addition crosslinkable organopolysiloxane composition was carried out as described in Example 8, but 0.694 g of the Pt-containing siloxane particles prepared in Example 5 were used.

Example 12

The preparation of an addition crosslinkable organopolysiloxane composition was carried out as described in Example 8, but 1.19 g of the Pt-containing siloxane particles prepared in Example 6 were used.

Example 13

The preparation of an addition crosslinkable organopolysiloxane composition was carried out as described in Example 8, but 1.14 g of the Pt-containing siloxane particles prepared in Example 7 were used.

Example C14
(not according to the invention)

The preparation of an addition crosslinkable organopolysiloxane composition was carried out as described in Example 8, but 96 mg of the platinum/divinyltetramethyldisiloxane complex prepared in Example 1 were used.

Example 15

589 parts by weight of a vinyldirnethylsiloxy-terminated polydimethylsiloxane having a Brabender plasticity of 630 daNm, corresponding to a mean molar mass of about 500,000 g/mol, were mixed in portions with 253 parts by weight of a hydrophobic pyrogenic silicic acid having a BET surface area of 300 m²/g and a carbon content of 3.9% by weight for 4 hours in a compounder to give a homogeneous composition.

492 g of this base composition were mixed on a roll at a temperature of 20° C. with 0.30 g of ethynylcyclohexanol, 7.5 g of SiH crosslinking agent and 1.25 g of Pt-containing siloxane particles from Example 2 to give a silicone composition, where the SiH crosslinking agent was a copolymer of dirnethylsiloxy, methylhydrogensiloxy and trimethylsiloxy units having a viscosity of 320 mPa.s at 25° C. and a content of Si-bonded hydrogen of 0.48% by weight. The Pt content of the silicone composition was 5 ppm.

Example 16

The preparation of an addition crosslinkable organopolysiloxane composition was carried out as described in Example 15, but 0.735 g of the Pt-containing siloxane particles prepared in Example 3 were used.

Example 17

The preparation of an addition crosslinkable organopolysiloxane composition was carried out as described in Example 15, but 1.79 g of the Pt-containing siloxane particles prepared in Example 4 were used.

Example 18

The preparation of an addition crosslinkable organopolysiloxane composition was carried out as described in Example 15, but 0.694 g of the Pt-containing siloxane particles prepared in Example 5 were used.

Example 19

The preparation of an addition crosslinkable organopolysiloxane composition was carried out as described in Example 15, but 1.19 g of the Pt-containing siloxane particles prepared in Example 6 were used.

Example 20

The preparation of an addition crosslinkable organopolysiloxane composition was carried out as described in Example 15, but 1.14 g of the Pt-containing siloxane particles prepared in Example 7 were used.

Example C21
(not according to the invention)

The preparation of an addition crosslinkable organopolysiloxane composition was carried out as described in Example 15, but 96 mg of the platinum/divinyltetramethyldisiloxane complex prepared in Example 1 were used.

The thermal crosslinking characteristics of the silicone compositions from Examples 8 to 21 were measured using a Goettfert elastograph. In order to determine the shelf life quantitatively, the formulations prepared were stored at room temperature and 50° C., with the time (measured in days) for the initial viscosity value to double being determined. The measurement results are shown in Table 1, where $a_T$ is the initiation temperature, d is days and s is seconds.

TABLE 1

| | $a_T$ [° C.] | $t_{90}$ [s] | Storage at RT [d] | Storage at 50° C. [d] |
|---|---|---|---|---|
| Ex. 8 | 129 | 31 | >90 | 28 |
| Ex. 9 | 130 | 30 | >90 | 26 |
| Ex. 10 | 127 | 28 | 41 | 9 |
| Ex. 11 | 135 | 42 | >90 | 35 |
| Ex. 12 | 132 | 34 | >90 | 24 |
| Ex. 13 | 134 | 33 | >90 | 37 |
| Ex. C14 | 116 | 25 | 10 d | <1 d |
| Ex. 15 | 124 | 27 | >90 | 35 |
| Ex. 16 | 124 | 28 | >90 | 30 |
| Ex. 17 | 120 | 25 | 27 | 7 |
| Ex. 18 | 136 | 44 | >90 | 39 |
| Ex. 19 | 126 | 26 | >90 | 32 |
| Ex. 20 | 131 | 35 | >90 | 40 |
| Ex. C21 | 112 | 22 | 8d | <1 d |

The initiation temperature $a_T$ was determined at a heating rate of 10 K/min. The temperature corresponding to the 4% value of the maximum torque was defined as the initiation temperature. The $t_{90}$ value was determined in accordance with DIN 53529 Part 3. The time from commencement of curing to 90% ($t_{90}$ value) of the maximum torque was determined at 180° C.

The crosslinked silicone elastomers were prepared by crosslinking the mixture from the respective example in a hydraulic press at a temperature of 170° C. for 10 minutes to give the silicone elastomer. The demolded silicone elastomer films with a thickness of about 2 mm or 6 mm were subjected to mechanical tests. The physical properties are reported in Table 2. The hardness is measured in accordance with DIN 53505; the tear strength (TS) in accordance with DIN 53504-S1; the elongation at break (EB) in accordance with DIN 53504-S1; tear propagation strength (TPS) in accordance with ASTM D 624; and rebound elasticity (RE) in accordance with DIN 53512.

TABLE 2

| | Hardness [Shore A] | TS [N/mm²] | EB [%] | TPS [N/mm] | RE [%] |
|---|---|---|---|---|---|
| Example 8 | 49 | 9.1 | 600 | 28 | 59 |
| Example 9 | 48 | 8.7 | 630 | 26 | 61 |
| Example 10 | 49 | 9.0 | 610 | 27 | 61 |
| Example 11 | 43 | 8.1 | 680 | 24 | 58 |
| Example 12 | 47 | 8.9 | 590 | 27 | 60 |
| Example 13 | 49 | 9.0 | 580 | 28 | 59 |
| Example C14 | 50 | 9.2 | 590 | 29 | 58 |
| Example 15 | 38 | 12.6 | 1180 | 49 | 49 |
| Example 16 | 36 | 12.5 | 1190 | 48 | 50 |
| Bxample 17 | 37 | 13.1 | 1090 | 48 | 52 |
| Example 18 | 32 | 12.2 | 1250 | 45 | 48 |
| Example 19 | 36 | 12.8 | 1150 | 48 | 50 |
| Example 20 | 37 | 12.7 | 1120 | 48 | 51 |
| Example C21 | 38 | 13.0 | 1130 | 51 | 50 |

As can be seen from Table 2, the mechanical properties of the silicone elastomers are changed hardly at all by the use of suitable Pt-containing siloxane particle catalysts.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. By the terms "a" and "an" are meant "one or more" unless indicated to the contrary.

What is claimed is:

1. Organopolysiloxane particles having a particle size of 0.01 to 10 μm comprising an organopolysiloxane (O) and a hydrosilylation catalyst (H), optionally having a core/shell structure, wherein when no core/shell structure is present, the particles exhibit no softening point, melting point, or glass transition temperature in the range of 20° C. to 260° C., and when a core/shell structure is present, at least the outermost shell exhibits no softening point, melting point, or glass transition temperature in the range of 20° C. to 260° C.

2. Organopolysiloxane particles as claimed in claim 1, in which the organopolysiloxane (O) of the organopolysiloxane particles comprises from from 0 to 40.0% by weight of units of the general formula $$[R_3SiO_{1/2}] \tag{1}$$

from 0 to 95.0% by weight of units of the general formula $$[R_2SiO_{2/2}] \tag{2}$$

from 0 to 100% by weight of units of the general formula $$[RSiO_{3/2}] \tag{3},$$

and from 0 to 60.0% by weight of units of the general formula $$[SiO_{4/2}] \tag{4},$$

where

R are identical or different monovalent, SiC-bonded, optionally substituted $C_1$- to $C_{18}$-hydrocarbon radicals, with the proviso that the units of the general formulae (1) to (4) together contain at most 10% by weight of uncondensed radicals ≡SiOH and unhydrolyzed radicals ≡Si—OR¹, where R¹ are identical or different monovalent, SiOC-bonded, optionally substituted $C_1$- to $C_8$-hydrocarbonoxy radicals.

3. Organopolysiloxane particles as claimed in claim 2, in which the total number of units of the general formulae (3) and (4) is at least 5.0% by weight of the organopolysiloxane constituent (O).

4. Organopolysiloxane particles as claimed in claim 1, in which the weight of metal present in the hydrosilylation catalyst (H) is 0.01–4% by weight, based on the weight of the particles.

5. Organopolysiloxane particles as claimed in claim 2, in which the weight of metal present in the hydrosilylation catalyst (H) is 0.01–4% by weight, based on the weight of the particles.

6. Organopolysiloxane particles as claimed in claim 3, in which the weight of metal present in the hydrosilylation catalyst (H) is 0.01–4% by weight, based on the weight of the particles.

7. A one-component, addition-crosslinking, thermocurable silicone composition which comprises the constituents (I) an alkenyl-functional polyorganosiloxane, (II) an SiH-functional crosslinking agent, and (III) organopolysiloxane particles containing hydrosilylation catalysts (H) and organopolysiloxane (O) as claimed in claim 1.

8. A silicone composition as claimed in claim 7, in which the content of organopolysiloxane particles (III) is selected so that the silicone composition has a Pt content of 0.1–100 ppm.

* * * * *